United States Patent
Ikonomov et al.

(10) Patent No.: US 10,183,456 B2
(45) Date of Patent: Jan. 22, 2019

(54) TREADS AND METHODS FOR MAKING A RETREADED TIRE

(71) Applicants: Metodi L. Ikonomov, Clermont-Ferrand (FR); Cesar E. Zarak, Simpsonville, SC (US); E. Bruce Colby, Greenville, SC (US)

(72) Inventors: Metodi L. Ikonomov, Clermont-Ferrand (FR); Cesar E. Zarak, Simpsonville, SC (US); E. Bruce Colby, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 618 days.

(21) Appl. No.: 14/787,995

(22) PCT Filed: Apr. 30, 2013

(86) PCT No.: PCT/US2013/038877
§ 371 (c)(1),
(2) Date: Oct. 29, 2015

(87) PCT Pub. No.: WO2014/178849
PCT Pub. Date: Nov. 6, 2014

(65) Prior Publication Data
US 2016/0101582 A1    Apr. 14, 2016

(51) Int. Cl.
*B29D 30/56* (2006.01)
*B29D 30/54* (2006.01)
(Continued)

(52) U.S. Cl.
CPC ............. *B29D 30/54* (2013.01); *B29C 65/48* (2013.01); *B29C 66/00145* (2013.01);
(Continued)

(58) Field of Classification Search
CPC .. B29D 30/54; B29D 30/56; B29D 2030/544; B29D 2030/541; B29D 2030/582
See application file for complete search history.

(56) References Cited

U.S. PATENT DOCUMENTS 3,745,084 A    7/1973   Schelkmann
3,904,459 A *  9/1975   Schelkmann ........ B29D 30/542
                                               156/96

(Continued)

FOREIGN PATENT DOCUMENTS

CA    2149270 A  *  6/1996
CA    2149270 A1    6/1996
(Continued)

OTHER PUBLICATIONS

Machine translation for China 201670058 (Year: 2018).*
(Continued)

*Primary Examiner* — Steven D Maki
(74) *Attorney, Agent, or Firm* — Hahn Loeser & Parks LLP; Bret A. Hrivnak

(57) ABSTRACT

Particular embodiments include a retreaded tire and a method for retreading a tire. A method may include providing a tire tread having a thickness and a width with grooves extending into the thickness from a tread top side, and providing a tire carcass having an annular tread-receiving side. The method may include applying the tread to the tire carcass with a layer of bonding material arranged between the tread and the tire carcass, and evacuating a gas from between the tire carcass and the tread bottom side through an aperture extending through the tread thickness, the aperture being formed by piercing the tread thickness with a suctioning member arranged in operable communication with a vacuum source, and bonding the tread to the tire carcass. In particular embodiments, portions of the bottom side of the tread beneath the grooves are not bonded to the tire carcass or the bonding layer.

16 Claims, 5 Drawing Sheets

(51) Int. Cl.
  *B60C 11/02* (2006.01)
  *B29C 65/48* (2006.01)
  *B29C 65/00* (2006.01)
  *B29D 30/58* (2006.01)
  *B60C 11/03* (2006.01)
  *B60C 11/00* (2006.01)
  *B60C 11/13* (2006.01)
  *B29L 30/00* (2006.01)

(52) U.S. Cl.
  CPC .............. *B29D 30/56* (2013.01); *B60C 11/02* (2013.01); *B29D 2030/541* (2013.01); *B29D 2030/544* (2013.01); *B29D 2030/582* (2013.01); *B29L 2030/002* (2013.01); *B60C 2011/0033* (2013.01); *B60C 2011/0355* (2013.01); *B60C 2011/1361* (2013.01)

(56) References Cited

U.S. PATENT DOCUMENTS

| | | | | |
|---|---|---|---|---|
| 4,093,481 A | * | 6/1978 | Schelkmann | B29C 73/325 156/95 |
| 4,240,851 A | | 12/1980 | King | |
| 4,934,426 A | | 6/1990 | Remond et al. | |
| 5,053,094 A | * | 10/1991 | Detwiler | B29D 30/56 156/128.1 |
| 5,275,218 A | * | 1/1994 | Nakayama | B29D 30/542 152/209.17 |
| 5,603,366 A | | 2/1997 | Nakayama et al. | |
| 6,089,290 A | | 7/2000 | Chlebina et al. | |
| 2006/0117909 A1 | * | 6/2006 | Hsu | B29C 73/025 81/15.6 |

FOREIGN PATENT DOCUMENTS

| | | | |
|---|---|---|---|
| CN | 201670058 U | * | 12/2010 |
| DE | 202010006358 U1 | * | 9/2010 |
| EP | 0715948 A1 | | 6/1996 |
| GB | 746375 A | * | 3/1956 |
| WO | 2011002448 A1 | | 1/2011 |
| WO | WO-2011/002445 A1 | * | 1/2011 |
| WO | WO-2011/002448 A1 | * | 1/2011 |
| WO | 2012091708 A1 | | 7/2012 |

OTHER PUBLICATIONS

Machine translation for German 202010006358 (Year: 2018).*
PCT/US2013/038877 International Search Report and Written Opinion dated Aug. 23, 2013, 14 pages.

* cited by examiner

TREADS AND METHODS FOR MAKING A RETREADED TIRE

This application is a National Stage application of International Application No. PCT/US2013/038877, filed Apr. 30, 2013.

BACKGROUND OF THE INVENTION

Field of the Invention

This invention relates generally to retreaded tires, and more particularly, to retreaded tires with improved evacuation of gas from between the tread and tire carcass.

Description of the Related Art

It is commonly known to form a retreaded tire by attaching a precured tread to a tire carcass. The tread is typically pre-formed into a strip having a tread pattern, and is then applied around the circumference of a prepared tire carcass. The tire carcass is typically prepared by removing the old tread and a layer of cushion gum or liaison rubber is applied to the tire carcass prior to receiving the new tread.

In prior methods, after the retreaded tire is assembled, the retreaded tire is placed at least partially within a flexible curing membrane, or envelope, to create a fluid chamber between the curing membrane and the tire. The retread tire assembly with the envelope is placed within a curing chamber, often referred to as an autoclave, where the membrane-covered assembly is exposed to heat and pressure according to a desired curing process to bond the tread to the tire carcass. Before and during the early portion of the curing cycle, substantially all of the air or other gases between the tire and envelope is removed by a vacuum source. Evacuating gas from between the tire and the envelope forces the flexible membrane against the tread and tire carcass. As the curing cycle progresses, the compartment between the tire and envelope is maintained at the same or a lower pressure than the pressure in the curing vessel outside of the envelope. The prior processes using curing membranes have drawbacks, such as inefficiency in handling and installing the membranes over the tire assembly, a limited number of curing cycles the membranes withstand before they have to be replaced, and for certain tread designs, the pressure differential used in prior processes could cause deformation or bulging at the bottom of grooves in the tread.

Certain prior methods have attempted different ways to evacuate gas from between the tread and tire carcass. It would be advantageous to improve evacuation of gas from between the tread and tire carcass.

SUMMARY OF THE INVENTION

Particular embodiments of the present invention include retreaded tires and methods of their manufacture. Particular embodiments include methods that may include providing a tire tread having a tread thickness bounded by a top side and a bottom side, the top side configured to engage a tire-operating surface and the bottom side configured for attachment to an annular tire carcass and a tread width bounded by opposing lateral sides. The tread may include a groove extending into the tread thickness from the top side and terminating within the tread thickness at a groove bottom arranged between a pair of opposing groove sides defining a width of the groove, where an undergroove thickness extends from the groove bottom to the tread bottom side. Such methods may include providing a tire carcass having an annular tread-receiving side which includes a width extending across a width of the tire carcass, and applying the tire tread to the tire carcass with a layer of bonding material arranged between the tire tread and the tire carcass. The methods may further include evacuating a gas from between the tire carcass and the tread bottom side through an aperture extending through the tread thickness, the aperture being formed by piercing the tread thickness with a suctioning member arranged in operable communication with a vacuum source; and, bonding the tire tread to the tire carcass.

Other embodiments include methods that may include providing a tire tread, the tire tread having a tread thickness bounded by a top side and a bottom side, the top side configured to engage a tire-operating surface and the bottom side configured for attachment to an annular tire carcass and a tread width bounded by opposing lateral sides. The tread may include a groove extending into the tread thickness from the top side and terminating within the tread thickness at a groove bottom arranged between a pair of opposing groove sides defining a width of the groove, where an undergroove thickness extends from the groove bottom to form a protruding portion of the tread bottom side below the groove bottom such that adjacent portions of the tread bottom side located adjacent the protruding portion are recessed within the tread thickness from an outer side of the protruding portion. The method may further include providing a tire carcass having an annular tread-receiving side having a width extending across a width of the tire carcass, and applying the tire tread to the tire carcass with a layer of bonding material arranged between the tire tread and the tire carcass. In such embodiments, the layer of bonding material is arranged intermittently across the width of the tread-receiving portion of the tire carcass and the width of the tire tread along the bottom side such that the layer includes one or more discontinuities arranged across a width of the bonding layer each forming a void within a thickness of the bonding layer, the bonding material engaging the adjacent portions of the tread bottom side located adjacent the protruding portion such that the protruding portion of the tread bottom side is positioned within one of the one or more discontinuities in the layer of bonding material. Such methods may include bonding the tread to the tire carcass, where at least a portion of the outer side of the protruding portion is not bonded to the tire carcass or the bonding layer.

In particular embodiments, a retreaded tire has a tire tread bonded to a tire carcass. The tire tread has a tread thickness bounded by a top side and a bottom side, the top side configured to engage a tire-operating surface and the bottom side configured for attachment to an annular tire carcass, and a tread width bounded by opposing lateral sides. The tread further includes a groove extending into the tread thickness from the top side and terminating within the tread thickness at a groove bottom arranged between a pair of opposing groove sides defining a width of the groove, where an undergroove thickness extends from the groove bottom to form a protruding portion of the tread bottom side below the groove bottom such that adjacent portions of the tread bottom side located adjacent the protruding portion are recessed within the tread thickness from an outer side of the protruding portion. The retreaded tire includes a tire carcass having an annular tread-receiving side having a width extending across a width of the tire carcass, and a layer of bonding material arranged between the tire tread and the tire carcass. In particular embodiments of such tire, the layer of bonding material is arranged intermittently across the width of the tread-receiving portion of the tire carcass and the width of the tire tread along the bottom side such that the layer includes one or more discontinuities arranged across a width of the bonding layer each forming a void within a thickness of the bonding layer, the bonding material engaging the adjacent portions of the tread bottom side located adjacent the protruding portion such that the protruding portion of the bottom side is positioned within one of the one or more discontinuities in the layer of bonding material. In particular embodiments, at least a portion of the outer side of the protruding portion is not bonded to the tire carcass or the bonding layer.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Figure 1:
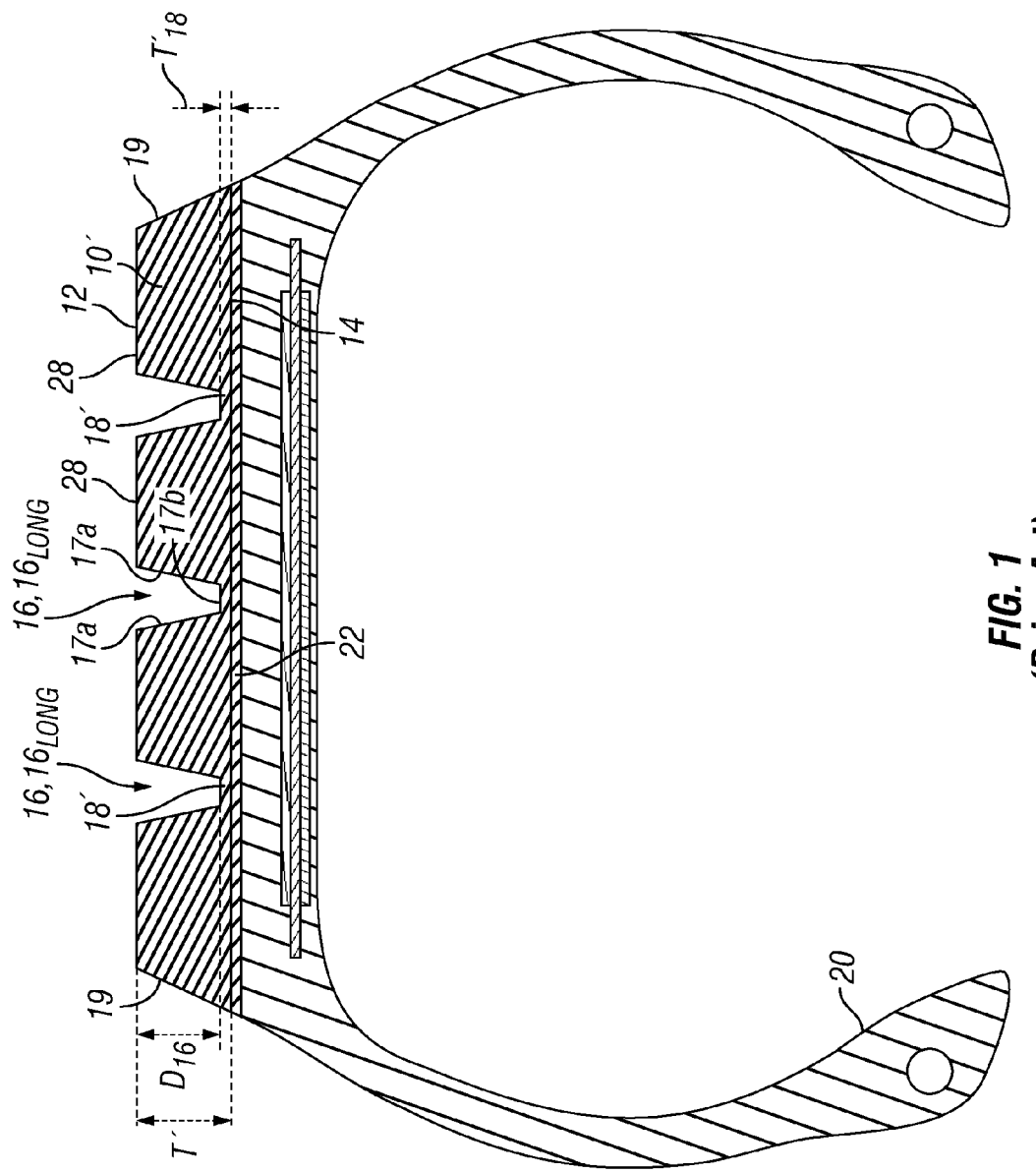
FIG. 1 is a side cross sectional view taken laterally across a retreated tire with a prior art tread arranged atop a tire carcass, the tread including longitudinal grooves extending between a top side and an undertread.

Particular embodiments of the invention provide a tire tread, tires incorporating such treads, and methods for forming a retreaded tire. Particular embodiments of such methods of forming a retreaded tire comprise the step of applying a tire tread to a tire carcass. The tire carcass generally includes a pair of beads, a pair of sidewalls, body plies, and a belt package if the tire is a radial tire (otherwise, if not including a belt package, the tire is a biased ply tire).

The body plies and belt package generally comprise plies of rubber containing strands of reinforcements. When retreading a tire, a used tire carcass is provided, which generally comprises a cured tire having at least a portion of the old tread removed so that a new tread may be attached to the tire carcass to form a retreaded tire. Commonly, at least a portion of the old tread is removed to a desired depth by performing a buffing or abrading operation. The old tread may be completely or partially removed. When forming a new tire, in lieu of a retreaded tire, a new tire carcass is provided, where such tire carcass is generally uncured. The prepared tire carcass has an annular tread-receiving side which includes a width extending across a width of the tire carcass.

In particular embodiments of a method for retreading a tire, the method includes providing a tire tread having a tread thickness bounded by a top side and a bottom side, the top side configured to engage a tire-operating surface and the bottom side configured for attachment to an annular tire carcass and a tread width bounded by opposing lateral sides. The tread includes a groove extending into the tread thickness from the top side and terminating within the tread thickness at a groove bottom arranged between a pair of opposing groove sides defining a width of the groove, where an undergroove thickness extends from the groove bottom to the tread bottom side. Such methods include providing the tire carcass having an annular tread-receiving side which includes a width extending across a width of the tire carcass, and applying the tire tread to the tire carcass with a layer of bonding material arranged between the tire tread and the tire carcass. In this embodiment, the method further includes evacuating a gas from between the tire carcass and the tread bottom side through an aperture extending through the tread thickness, the aperture being formed by piercing the tread thickness with a suctioning member arranged in operable communication with a vacuum source; and, bonding the tire tread to the tire carcass.

Particular embodiments of such methods include the step of providing a tire tread having a tread thickness bounded by a top side, also referred to as a ground-engaging side of the tread, configured to engage a surface upon which the tire operates during vehicle operation, and a bottom side configured for attachment to an annular tire carcass. The tread has a tread width extending generally perpendicular to the tread thickness and tread length bounded by opposing lateral sides. The tread includes a groove extending into the tread thickness from the tread top side and terminating within a thickness of the tread at a groove bottom, the groove bottom being arranged between a pair of opposing sides defining a width of the groove, and the tread having an undergroove thickness extending from the groove bottom to the tread bottom side. It is understood that the groove may comprise any type of groove having a groove bottom, where the groove is characterized as having any desired size, shape, and geometry that may be employed in any desired tire tread and may comprise a plurality of such grooves as desired. The tread may be molded and cured according to any known method and operation of retreading, which includes molding and curing the tread prior to applying the tread to the tire carcass to provide a precured tire tread.

When applying the tread to the tire, bonding material may be employed to attach or improve attachment of the tread to the tire carcass. For example, a bonding rubber may comprise a natural or synthetic rubber arranged between the tread and the tire carcass. By further example, the bonding material may comprise an adhesive arranged between the tread and the tire carcass. In such instances, the methods further include the step of arranging a layer of bonding material between the bottom side of the tire tread and the tire carcass.

Particular embodiments of such methods include the step of evacuating a gas from between the tire carcass and the tread bottom side through an aperture extending through the tread thickness. In particular embodiments, the aperture is formed by piercing the tread thickness with a suctioning member arranged in operable communication with a vacuum source. For example, the suctioning member may include a needle or other conduit adapted for piercing through at least a portion of the tread thickness. The aperture may be formed through any portion of the tread thickness as desired, and in various embodiments may enter a cavity or void arranged between the tread and tire carcass. In particular embodiments, the aperture is formed by piercing a conduit through at least a portion of the undergroove thickness, for example, through the groove bottom. The suctioning member includes a gas inlet opening in operable communication with the vacuum source, adapted to evacuate gasses from and create a pressure differential between the tire tread and tire carcass. In particular embodiments, the conduit is positioned within the bonding layer such that the inlet opening is spanning between a top and a bottom of the layer of bonding material in an installed position, for example, when the suctioning member is operatively positioned in the aperture. In such embodiments, the conduit inlet opening may be sized and positioned to evacuate gases from an interface between the bottom side of the tread and the layer of bonding material, and an interface between the layer of bonding material and the tire carcass simultaneously when the suctioning member is operatively positioned in the aperture.

A portion of the aperture may be formed into the tire tread prior to piercing the tread thickness, for example, by forming a guide hole through a portion of the tread thickness during the process of forming or molding the tread or after making the tread. Alternatively or additionally, a clearance hole may be provided in the tread extending from the bottom side into the tread thickness. A guide hole and/or a clearance hole provides less material for the piercing conduit to pierce through. In particular embodiments, the suctioning member includes a spacer configured to position a terminal end of the suctioning member at a desired depth within the tread thickness or assembled retreaded tire. For example, the suctioning member may pierce through the tread thickness until the spacer contacts the tread stopping the gas inlet opening of the suctioning member in a desired position, such as adjacent the layer of bonding material and/or positioned in a cavity in communication with the bottom side of the tread. The spacer may be provided to keep the leading end of the suctioning member from damaging the tire carcass.

In particular embodiments, the suctioning member may engage an aperture extending through a protruding member of the tread, the protruding member extending from the groove bottom into the groove. A plurality of protruding members may be provided along the length of the groove, or between different grooves providing multiple locations for evacuating gas from the tire assembly. In such embodiments, at least a portion of the aperture may be formed into the protruding member prior to the step of evacuating a gas. The protruding members may be arranged in any one or more grooves, where such one or more grooves may comprise longitudinal and/or lateral grooves. The protruding members may also extend partially or fully across the groove width, and in any path or direction. In particular embodiments, for example, the protruding members extend from one or both sides of a groove. Furthermore, the protruding members may form any desired shape. For example, the cross-sectional shape of the protruding members (as taken in a plane extending in a direction of the tread thickness and along a direction of the groove) may be block-shaped, polygonal, arcuate, rounded, or other shapes as desired. Finally, the size, shape, and direction of extension may vary amongst any plurality of protruding members along the length of any groove or between different grooves within the tire tread. Optionally, after the tire is cured, the protruding member may be removed from the tire by grinding, buffing, or cutting the protruding member from the tire.

In particular embodiments, the aperture extending through the tread thickness is arranged in fluid communication with one or more cavities such as voids, grooves, channels, apertures, passageways, sipes, or other cavities arranged within the tread thickness of the tread provided, such as extending longitudinally (circumferentially) and/or laterally along the tread, forming a network or other pattern as desired arranged for drainage of gases from within the tread and/or between the tread and tire carcass. The cavity and/or network of cavities is in communication with the bottom side of the tread such that the step of evacuating a gas from between the tire carcass and the tread bottom side includes evacuating gas from the cavity.

The method for retreading a tire (that is, forming a retreaded tire) includes bonding the tire tread to the tire carcass. In particular embodiments, the step of bonding the tire tread to the tire carcass is a curing process performed concurrently or after the step of evacuating a gas. The assembled retreaded tire is placed within a curing chamber, often referred to as an autoclave, where the retreaded tire assembly is exposed to heat and pressure to bond the tread to the tire carcass according to a desired curing process. In particular embodiments, the step of bonding includes curing the tire without placing the tire in an evacuated curing envelope, such that the outer surface of the assembled retreaded tire is exposed to gases within the atmosphere of the curing chamber. During at least a portion of the curing process in the autoclave, the suctioning member continues to suction through the aperture such that pressure in the autoclave is greater than the pressure in cavities in the tread thickness in communication with the tread bottom side, for example, grooves, voids, channels or other cavities in communication with the tread bottom side. Such a pressure differential holds the tread against the tire carcass and draws gases through the aperture such as air and other gases resulting from the curing process from between the tread and tire carcass. In certain instances, the pressure differential between the cavities in the tread thickness and the curing chamber holds the undergroove thickness in its desired position so that upon completing the step of bonding the tire tread, the cross-sectional shape of the groove bottom extending in the direction of the groove width is substantially undeformed from a molded cross-sectional shape of the groove bottom. This allows the depth (that is, the skid depth) of the top side groove to remain generally unchanged so to achieve a desired or targeted depth.

In more particular embodiments, the tire tread includes the undergroove thickness of the tread extending from the groove bottom to form a protruding portion of the tread bottom side below the groove bottom such that adjacent portions of the tread bottom side located adjacent the protruding portion are recessed within the tread thickness from an outer side of the protruding portion. In such embodiments, the groove may comprise any groove contemplated above and otherwise herein, of any design, size, configuration, or arrangement, and may comprise a plurality of such grooves as desired. More generally, a tread having a protruding portion may comprise any tread otherwise contemplated herein.

With regard to the protruding portion, the protruding portion may comprise any shaped protruding structure extending outwardly along the bottom side, and may define any constant or variable undergroove thickness extending between the groove bottom and an outer side or surface of the protruding portion, which is also the outer side or surface of the undergroove and of the bottom side. For example, protruding portion, which at least partially comprises an undergroove (or undergroove thickness) arranged below a groove bottom and between the groove bottom and the tread bottom side, may have a cross-section extending in a direction of the groove width that is polygonal. By further example, the outer side of the protruding portion or of the undergroove may be generally polygonal and may have any planar or non-planar outer side surface. For example, in particular embodiments, the outer side of the protruding portion has an apex defining maximum extent of the protruding portion relative the adjacent portions of the bottom side. In such embodiments, in achieving an apex the outer side may extend in a direction of the groove width along an arcuate path, to provide an arcuate cross-sectional shape, or along a V-shaped path, to provide a triangular cross-sectional shape.

As with other embodiments described herein, the undergroove thickness associated with the protruding portion of the bottom side may be any desired and contemplated thickness. Furthermore, the protruding portion of the bottom side of the tread below the groove bottom may be offset (or extend from any adjacent portion forming a recess) by any desired distance. For example, the protruding portion of the bottom side is offset from any adjacent portion of the bottom side in the direction of the tire carcass by 1.5 millimeters (mm). Alternatively, the offset is 2 mm. In particular embodiments, the offset is between 2 mm and 6 mm. Other offsets of the undergroove thicknesses, smaller and larger, are contemplated. In particular embodiments, the method may include, prior to applying the tread, preparing a bonding surface of the tire carcass by removing a thickness of the tire carcass to form a cavity configured to receive the protruding portion of the tread. For example, the cavity for receiving the protruding portion may be a groove cut into the tire carcass, and may extend circumferentially around the tire carcass. It is contemplated that the cavity removed from the tire carcass configured to receive the protruding portion of the tread may be larger than the protruding portion (in width, length, and/or depth) to accommodate manufacturing and assembly tolerances.

In defining the protruding portion of the bottom side, adjacent portions of the bottom side are recessed within the tread thickness from, or relative to, the outer side of the protruding portion. For example, in particular embodiments, each of the adjacent portions comprise portions of the bottom side arranged below a tread element. In providing a protruding portion along the bottom side of the tread, it can be said that, in relation to the tire carcass, the portion of the bottom side below the groove bottom (protruding portion) forming the undergroove thickness is offset in the direction of the tire carcass forming ridges in the bottom side.

In particular embodiments, the layer of bonding material is arranged intermittently across the width of the tread-receiving portion of the tire carcass and the width of the tire tread along the bottom side such that the layer includes one or more discontinuities arranged across a width of the bonding layer each forming a void within a thickness of the bonding layer, the bonding material engaging the adjacent portions of the tread bottom side located adjacent the protruding portion such that the protruding portion of the bottom side is positioned within one of the one or more discontinuities in the layer of bonding material. Stated another way, the layer of bonding material is provided on the adjacent portions of the bottom side that are recessed within the tread thickness relative to the outer side of the protruding portion. In particular embodiments, the layer of bonding material is provided on the recessed portions adjacent the protruding portions of the bottom side with discontinuities in the layer of bonding material positioned such that at least a portion of the outer side of the protruding portion is at least partially free of bonding material. In particular embodiments, the step of bonding the tire tread to the tire carcass comprises bonding the tread to the tire carcass with at least a portion of the outer side of the protruding portion not bonded to the tire carcass or the bonding layer.

Particular embodiments having voids in the layer of bonding material may comprise the voids including continuous or discontinuous longitudinal voids, where the protruding portions extend in a direction of the tread length continuously or discontinuously along a length of the tread, where the voids are arranged to correspond to and receive an arrangement of the protruding portions. Alternatively or additionally, in particular embodiments the voids include continuous or discontinuous lateral voids, and the protruding portions extend in a direction of the tread width continuously or discontinuously along a width of the tread, where the voids are arranged to correspond to and receive an arrangement of the protruding portions.

In particular embodiments, the aperture extending through the tread thickness in communication with a suctioning member extends through the protruding portion of the bottom side and into the void in the layer of bonding material adjacent the protruding portion. In particular embodiments, the aperture extending through the tread thickness is arranged in fluid communication with one or more cavities such as voids, grooves, channels, apertures or other cavities arranged within the tread thickness in fluid communication with the void within a thickness of the bonding layer adjacent the protruding portion. The cavities arranged within the tread thickness may be arranged in a network arranged for drainage of gasses from within the tread and/or between the tread and tire carcass. The suctioning member draws suction through the aperture in fluid communication with the void within a thickness of the bonding layer adjacent the protruding portion to create a pressure differential between the void and the outside of the tire, where the pressure in the void is lower than the pressure outside of the tire, the pressure outside of the tire being, for example, the pressure in the curing autoclave.

In particular embodiments, the layer of bonding material is applied to the tire tread prior to the step of applying the tire tread to the tire carcass. Applying the bonding material to the tire tread prior to applying enables the tire tread to be prepared at a different time, and optionally, in a different place, than the assembly of the tire. The pre-applied bonding material may be covered by a protective film while shipping and handling the tread prior to assembly to the tire carcass. When covered by a protective film, the method includes the step of removing the film from along the provided tread prior to the step of applying the tire tread to the tire carcass. Whether the bonding material is applied to the tread or the tire carcass, in particular embodiments the layer of bonding material is applied by extrusion. In other embodiments, the layer of bonding material is applied using pre-formed strips.

In particular embodiments, voids in the layer of bonding material are formed by applying the layer of bonding material arranged such that the bonding material engages the adjacent portions of the tread bottom side located adjacent the protruding portion, thereby forming one or more discontinuities arranged across a width of the bonding layer. Each discontinuity forms a void within a thickness of the bonding layer, the voids being arranged such that the protruding portion of the bottom side is positioned within one of the one or more voids when the tread is assembly to the tire carcass. In particular embodiments, the voids are in communication with a network of cavities within the tread thickness arranged for drainage of gasses from within the tread and/or between the tread and tire carcass. The thickness of the layer of bonding material may vary across the tire from one lateral side to the other, for example including a thicker portion of bonding material where additional material is cut from the tire carcass due to damage or wear.

In other embodiments of a method for retreading a tire, the method includes providing a tire tread, the tire tread having a tread thickness bounded by a top side and a bottom side, the top side configured to engage a tire-operating surface and the bottom side configured for attachment to an annular tire carcass and a tread width bounded by opposing lateral sides. In this embodiment, the method includes a groove extending into the tread thickness from the top side and terminating within the tread thickness at a groove bottom arranged between a pair of opposing groove sides defining a width of the groove, where an undergroove thickness extends from the groove bottom to form a protruding portion of the tread bottom side below the groove bottom such that adjacent portions of the tread bottom side located adjacent the protruding portion are recessed within the tread thickness from an outer side of the protruding portion. The method includes providing a tire carcass having an annular tread-receiving side having a width extending across a width of the tire carcass, and applying the tire tread to the tire carcass with a layer of bonding material arranged between the tire tread and the tire carcass, where the layer of bonding material is arranged intermittently across the width of the tread-receiving portion of the tire carcass and the width of the tire tread along the bottom side such that the layer includes one or more discontinuities arranged across a width of the bonding layer each forming a void within a thickness of the bonding layer, the bonding material engaging the adjacent portions of the tread bottom side located adjacent the protruding portion such that the protruding portion of the tread bottom side is positioned within one of the one or more discontinuities in the layer of bonding material. Particular embodiments of the method include bonding the tread to the tire carcass, where at least a portion of the outer side of the protruding portion is not bonded to the tire carcass or the bonding layer.

The tread has an undergroove thickness extending from the groove bottom to form a protruding portion of the tread bottom side below the groove bottom as discussed above with respect to protruding portions and otherwise described herein.

The layer of bonding material is arranged intermittently such that the layer includes one or more discontinuities arranged across a width of the bonding layer, the discontinuities forming voids in the bonding layer as discussed above with respect to discontinuities in the bonding layer and otherwise described herein.

Particular embodiments of such methods include evacuating a gas from between the tire carcass and the tread bottom side after the step of applying the tire tread to the tire carcass. In particular embodiments, the method may include piercing the tread thickness with a suctioning member arranged in operable communication with a vacuum source as discussed above and otherwise described herein. In alternative embodiments, the step of bonding the tire tread to the tire carcass may include the step of placing a curing membrane around an outer circumference of the tread and at least a portion of the tire carcass. Curing membranes are also referred to as curing envelopes within the industry. It is understood that any known curing membrane to one of ordinary skill in the art, and any obvious variation thereof, may be employed in performing this step. Generally, a curing membrane includes an outer body, shell, or membrane having one or more sections to achieve its purpose of covering the outer tread surface and becoming sealed to create an interior pressurization compartment between the tread and the curing membrane, which is at least initially placed under vacuum pressure during retread curing operations to substantially remove the air between the curing membrane and the tire assembly. In particular embodiments using a curing envelope, the method may include providing an aperture through a tread thickness in fluid communication with the void within a thickness of the bonding layer, such that the void is in fluid communication with the pressurization compartment between the tread and curing membrane. The aperture may be formed through the groove bottom, for example, a passageway formed through the undergroove thickness. In particular embodiments, a through aperture, a stent or other conduit may be placed through the tread thickness, for example, through the undergroove thickness, such that the void is in fluid communication with the pressurization compartment between the tread and curing membrane. In other embodiments, such a stent or other conduit in fluid communication with the void within a thickness of the bonding layer may further pass through the curing envelope in operable communication with a vacuum source.

In particular embodiments of such methods, the layer of bonding material is applied to the tire tread prior to the step of applying the tire tread to the tire carcass as discussed above and otherwise described herein.

Particular embodiments of the methods discussed above will now be described in further detail below in association with the figures filed herewith exemplifying the performance of the methods in association with particular embodiments of the tread.

With reference to FIG. 1, a prior art tread 10' is shown in a cross-sectional view extending laterally across the tread. The tread 10' is shown as having a top side 12 and a bottom side 14 (each of which may also be referred to as top and bottom faces, respectfully) and a thickness T' extending there between. The tread also includes a plurality of grooves 16, such as longitudinal and lateral grooves, extending from the top side 12 towards the bottom side 14. In the figure shown, longitudinal grooves $16_{long}$ are shown extending from the top side 12 towards the bottom side 14. The grooves 16 terminate at a groove bottom 17b offset a distance $T'_{18}$ from the tread bottom side 14 to define an undergroove thickness. Typically, the prior art undergroove thickness $T'_{18}$ is equal to approximately 2.5-4.5 mm. The grooves 16 also have a width defined by opposing groove sides 17a. A skid depth $D_{16}$ is defined by the difference between the thickness T' between the top side 12 and bottom side 14 and the thickness $T'_{18}$ of the undergroove 18'. The skid depth $D_{16}$ is the thickness of useful tread within the precured retread, that is, a thickness designed to be available for wearing during vehicle operation. The tread 10' also extends between opposing lateral sides 19, which may be coextensive with a bonding portion of the tire carcass 20. The tread 10' is bonded at the tread bottom side 14 to the tire carcass 20, either directly or by use of a bonding material 22, such as a layer of bonding rubber or adhesive, arranged between the tread and the tire carcass.

Figure 2:
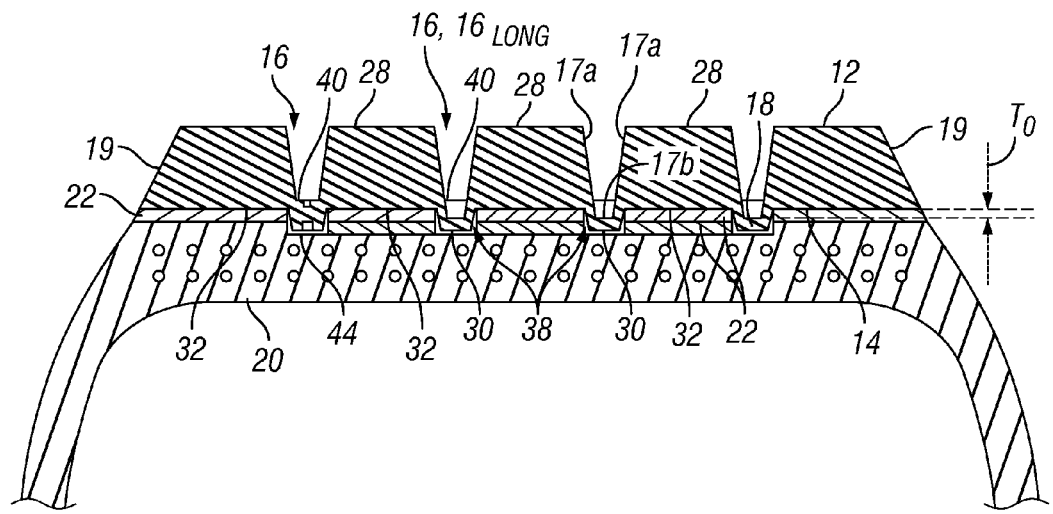
FIG. 2 is a front cross-sectional view of a tire tread taken across a retreated tire with the tread arranged atop a tire carcass, the tread bottom side having protruding portions and a portion of the outer side of the protruding portions are not bonded to the tire carcass or the bonding layer.
Figure 3:
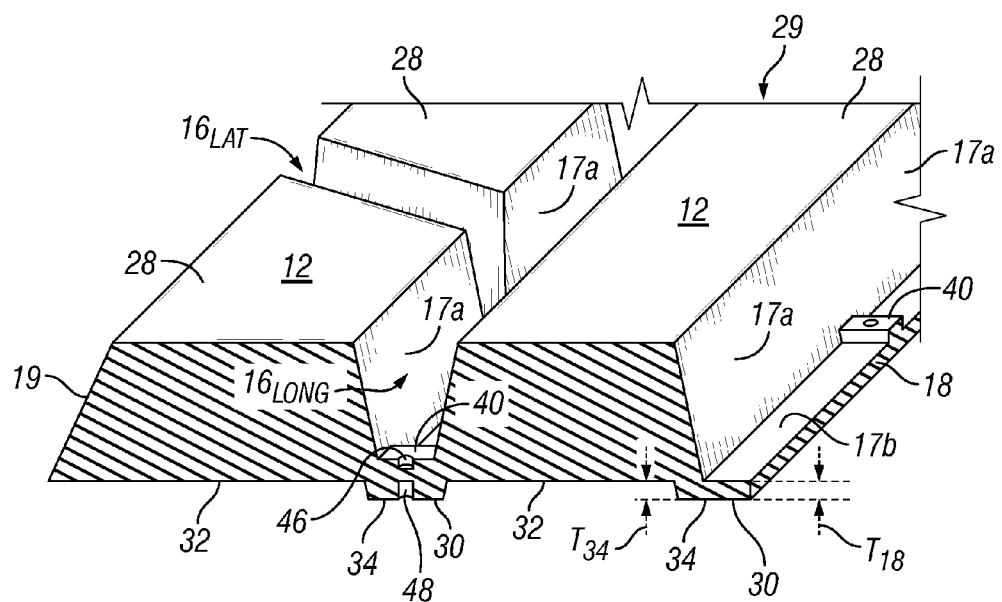
FIG. 3 is a partial cross sectional view of FIG. 2 in a perspective view showing the tread separated from the tire carcass, the tread having longitudinal grooves and lateral grooves extending width-wise with protruding members extending into the groove in accordance with an embodiment of the invention.
Figure 4:
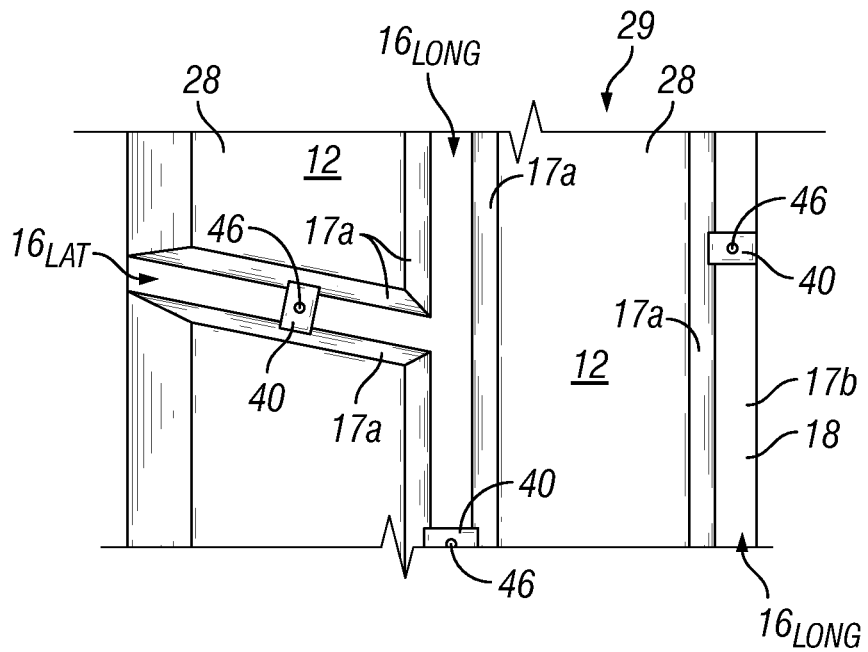
FIG. 4 is a top view of the tread shown in FIGS. 2 and 3 illustrating the lateral and longitudinal grooves having protruding members extending from the groove bottom into the tread.

With reference to FIGS. 2-4, an exemplary embodiment of the invention is shown. In particular, an exemplary tread 10 is arranged atop a tire carcass 20 with bonding material 22 arranged there between. The tread 10 includes a top side or face 12 (i.e., an outer side) and a bottom side or face 14 (i.e., an inner side). The tread 10 comprises a tread thickness T bounded depthwise by the top side 12 configured to engage the ground surface during tire operation and the bottom side 14 configured to attach to the tire carcass 20. The tread also has a tread width bounded by opposing lateral sides 19, the tread width extending generally perpendicular to the tread thickness and tread length. Typically, the width of the tread along the top side 12 is less than or the same as the width of the tread along the bottom side 14. The tread further includes a tread pattern arranged along the top side 12. The tread pattern includes one or more grooves, generally indicated as 16, comprising lateral grooves $16_{lat}$ and longitudinal grooves $16_{long}$ extending into the tread thickness from the top side 12 towards the bottom side 14. Longitudinal and lateral grooves $16_{long}$, $16_{lat}$ are shown to extend longitudinally (that is, in a lengthwise direction) along a linear path, although is it understood that each may extend lengthwise along any desired path, which includes any curvilinear path or non-linear path. As best shown in FIGS. 3-4 in a particular embodiment, longitudinal grooves $16_{long}$ extend along a linear, lengthwise path (generally circumferentially when installed along a tire carcass) while lateral grooves $16_{lat}$ extend along a widthwise or lateral path. Furthermore, the lateral and longitudinal grooves may extend along a continuous or discontinuous path. Prior to arrangement on the tire carcass 20, the longitudinal grooves $16_{long}$ may extend longitudinally in a lengthwise direction of the tread without extending circumferentially, such as when formed in a flat mold, for example. Lateral top grooves $16_{lat}$ may be provided on the top side of the tread extending in a widthwise or lateral direction of the tread transverse to the longitudinal or circumferential direction of the longitudinal grooves. An undergroove 18 having an undergroove thickness $T_{18}$ extends from the groove bottom 17b to the tread bottom side 14.

The arrangement of longitudinal grooves $16_{long}$ and lateral grooves $16_{lat}$ may form tread blocks or elements 28 arranged along the outer or top side 12. A rib 29 generally refers to a ground engaging portion along the circumference of the tread, and may include a single tread block 28 formed between laterally spaced longitudinal grooves $16_{long}$, such as shown in FIG. 3.

In particular embodiments, such as shown in FIGS. 2-4, the undergroove thickness 18 extends from the groove bottom 17b to form a protruding portion 30 of the tread bottom side 14 below the groove bottom. In such embodiments, the tread bottom side 14 includes adjacent portions 32 of the tread bottom side 14 located adjacent the protruding portion 30 which are recessed within the tread thickness from an outer side 34 of the protruding portion 30. The outer side 34 of the protruding portion 30 is offset a distance $T_{34}$ relative to the adjacent portions 32. The groove bottom 17b may be offset from the adjacent portions 32 in the direction of the tire carcass a distance $T_0$ as shown in FIG. 2. In particular embodiments, the groove bottom 17b may be about even with the adjacent portions 32 such that the offset distance $T_0$ is approximately zero (not shown). In other embodiments, the groove bottom 17b may be offset from the adjacent portions in the direction of the tread top side, such as the example tread shown in FIG. 8.

In the embodiment of FIG. 2, the layer of bonding material 22 is arranged intermittently across the width of the tread-receiving portion of the tire carcass 20 and the width of the tire tread 10 along the bottom side 14 such that the layer 22 includes one or more discontinuities 38 arranged across a width of the bonding layer each forming a void within a thickness of the bonding layer 22. The bonding material 22 engages the adjacent portions 32 of the tread bottom side 14 located adjacent the protruding portion such that the protruding portion 30 of the bottom side is positioned within one of the one or more discontinuities 38 in the layer of bonding material 22. In particular embodiments, at least a portion of the outer side 34 of the protruding portion 30 is not bonded to the tire carcass 20 or the bonding layer 22. In such embodiments, a portion of the undergroove 18 is not bonded to the tire carcass 20 or the bonding layer 22, and portions of the bottom side 14 beneath the tread elements 28 are substantially bonded to the tire carcass 20. In particular embodiments, the cross-sectional shape of the groove bottom extending in the direction of the groove width is substantially undeformed from a molded cross-sectional shape of the groove bottom.

The voids in the layer of bonding material may be continuous or discontinuous, and arranged to correspond to and receive the arrangement of protruding portions along the grooves. The voids and corresponding protruding portions may extend in a longitudinal direction of the tread continuously or discontinuously along a length of the tread. Alternatively or additionally, in particular embodiments the voids and corresponding protruding portions may extend in a lateral direction of the tread continuously or discontinuously along a width of the tread.

As shown in FIG. 2, the thickness of the layer of bonding material may vary across the tire from one lateral side to the other after the tire tread is applied to the tire carcass. In particular embodiments, for example shown in FIG. 2, the bonding surface of the tire carcass includes a cavity 44 in an outer surface of the tire carcass configured to receive the protruding portions 30. The cavity 44 removed from the tire carcass may be configured to accommodate a plurality of protruding portions 30 such as shown in FIG. 2, or may be sized to accommodate one protruding portion. The cavity may be larger than the protruding portion (in width, length, and/or depth) to accommodate manufacturing and assembly tolerances. In particular embodiments, the layer of bonding material 22 includes a thicker portion of bonding material where additional material is cut from the tire carcass, such as in the example of FIG. 2 which includes a thicker layer of bonding material 22 in the cavity 44.

Figure 5:
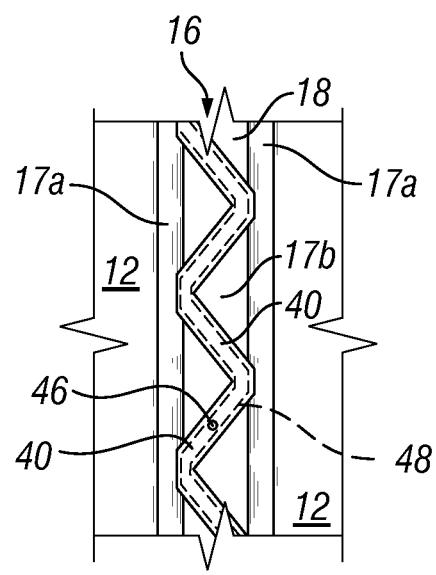
FIG. 5 is a top view of a second embodiment of the tread having a continuous protruding member extending from the groove bottom into the tread in a zig-zag arrangement.
Figure 6:
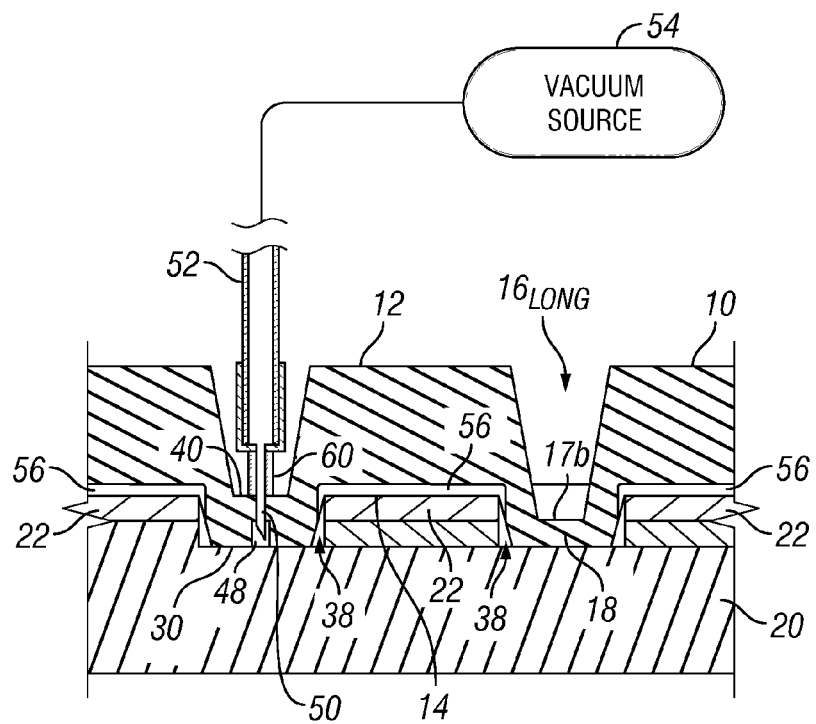
FIG. 6 is a partial cross sectional view of a third embodiment tread with a suctioning member operatively positioned prior in the tread thickness for evacuating gas from between the tread and the tire carcass with a network of cavities in the tread bottom side.

In particular embodiments, the tire tread includes protruding members 40 extending into the groove 16 from the groove bottom 17b as shown in FIG. 3, configured for use in evacuating a gas from between the tire carcass and the tread bottom side before and/or during the tire curing process. As shown in FIG. 6, the protruding members 40 may be adapted for use with inventive methods disclosed herein in which an aperture 50 is formed through the tread thickness by piercing the tread thickness with a suctioning member 52 arranged in operable communication with a vacuum source/suction device 54 as discussed above and otherwise herein. The protruding members 40 may include a guide hole 46 through a portion of the tread thickness, shown in FIGS. 3-5. Optionally, a clearance hole 48 may also be provided in the tread extending from the bottom side into the tread thickness. The guide hole 46 and, if present, the clearance hole 48 may be positioned approximately aligned, but not connecting such that the piercing conduit 52 inserted through the guide hole 46 pierces through a portion of the tread thickness to form a through aperture 50 as shown in FIG. 6. In particular embodiments, the material surrounding the aperture is resilient and pliable such that the pierced aperture fully or partially closes upon removal of the conduit thereby inhibiting passage of air and water through the aperture during operation of the retreaded tire. In other embodiments, the through aperture may remain open after the conduit is removed from the aperture. In certain embodiments, the through aperture may be formed through the tread thickness prior to engagement of the suctioning member. Particular embodiments arrange the aperture aligned with one of the discontinuities 38 in the layer of bonding material 22 to facilitate evacuation of gas from the corresponding void. The guide hole 46 in the protruding member, with or without the optional clearance hole 48, is not a necessary feature (for example, the guide hole omitted in the embodiment of FIG. 6) but may be provided to assist in placement of the suctioning member. In particular embodiments, the guide hole 46 and/or the protruding member 40 may be used for automatically locating the suctioning member, such as by a sensor or by physical interference or fit.

The protruding members may be any desired shape. As shown in FIG. 4, the protruding members may be polygonal in shape extending from one side of the groove to the other. The cross-sectional shape of the protruding members (as taken in a plane extending in a direction of the tread thickness and along a direction of the groove) may be block-shaped, polygonal, arcuate, rounded, or other shapes as desired. For example, as shown in FIG. 5, the protruding member 40 may be incorporated into a zig-zag or other shaped feature along the groove. In particular embodiments, the zig-zag protruding member 40 may include a channel 48 extending from the bottom side into the protruding member. In such an embodiment, the suctioning member may be pierced through the protruding member into the channel in any location as desired along the protruding member. The guide hole may be provided to locate the suctioning member in a desired position along the protruding member. Finally, the size, shape, and direction of extension of the protruding members may vary amongst any plurality of protruding members along the length of any groove or between different grooves within the tire tread.

A plurality of protruding members may be positioned on the tire tread as shown in FIGS. 3 and 4 providing a plurality of points for evacuation of gas from between the tire tread and tire carcass. It is contemplated that only one point may be used for evacuation of gas, with multiple protruding members provided for efficiency in locating a evacuation point during the retreading process. Alternatively, two or more evacuation points may be used to evacuate gas from the between the tire tread and tire carcass.

In addition to locating the suctioning member, the protruding member may also operate as a wear bar useful for determining the amount of tread remaining. For example, the height of the protruding member may be preselected to become exposed to the top surface of the tread when an intended thickness of the tread remains in the normal life of the tread. The protruding member may also operate as strengthening members useful for supporting the undergroove thickness, particularly for thin undergroove thicknesses. Furthermore, protruding members may operate as stone ejectors to assist in discharging any unwanted material from the groove, such as stones or other foreign matter, or noise suppressors for reducing the noise generation of the tread during tire operation. When operating as noise suppressors, the protruding members extend at least halfway through the depth or height of the groove and/or at least halfway across the groove width, and may extend substantially the full depth or height of the groove and/or substantially across the groove width. It is understood, however, that any prior art wear bars, strengthening members, stone ejectors, and noise suppressors are not configured or arranged to operate as the protruding members described herein, and are not taught for use in conjunction with suctioning members to solve the problems described herein that may arise during retreading operations. Accordingly, while the protruding members may be configured to operate as wear bars, strengthening members, stone ejectors, and/or noise suppressors, protruding members may or may not operate as such and may be arranged within a groove in addition to other wear bars, strengthening members, stone ejectors, and/or noise suppressors separately provided for their intended purpose.

Particular embodiments of the tread may further include one or more cavities arranged within the tread thickness, where the aperture is arranged in fluid communication with the cavities. The cavities may include cavities, voids, passageways, sipes, grooves, or other cavities extending longitudinally (circumferentially) and/or laterally along the tread, and may form a network or other pattern as desired arranged for drainage of gases from within the tread and/or between the tread and tire carcass. In the example shown in FIG. 6, the tread includes cavities 56 arranged in fluid communication with the voids formed in discontinuities 38 in the layer of bonding material 22 adjacent the protruding portion, the voids 38 being in fluid communication with the aperture 50. The cavities 56 may be arranged along the bottom side 14 of the tread, and in various embodiments, the cavities are in fluid communication with the bottom side 14 of the tread. In certain embodiments, not shown, the cavities are recessed or offset from both the top side and the bottom side such that the recessed void is in a middle portion of the tread.

Figure 7:
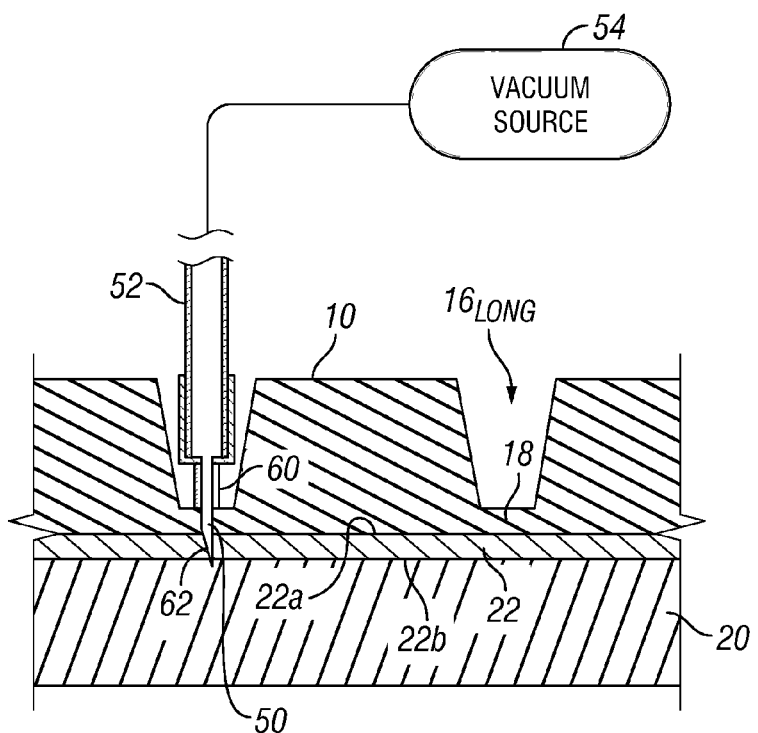
FIG. 7 is a the partial cross section view of a fourth embodiment tread with the suctioning member operatively positioned in the tread thickness for evacuating gas from between the tread and the tire carcass.

In particular embodiments such as shown in FIG. 7, the suctioning member 52 includes a gas inlet opening 62 spanning between a top 22a and a bottom 22b of the layer of bonding material 22 in an installed position. In particular embodiments, the tip has an opening 62 1-3 mm in height to span the layer of bonding material. In various embodiments, the layer of bonding material is about 2 mm thickness and the tip has an opening 62 between 2-3 mm in height. The suctioning member 52 may include a needle or other conduit adapted for piercing through at least a portion of the tread thickness, such as having a sharpened tip comprising the gas inlet opening. The sharpened tip with the gas inlet opening 62 may be angled such as shown in FIG. 7, or may have a rounded tip or a flat ended tip, or other tip as desired for the application. The diameter of the gas inlet opening 62 and the angle of the tip may be selected to provide a desired opening area for removing gases from the tire assembly. In various embodiments, such as shown in FIGS. 6 and 7, the suctioning member includes a spacer 60 configured to position a terminal end, such as the gas inlet opening 62 of the suctioning member 52 at a desired depth within the tread thickness or assembled retreaded tire. In particular embodiments, the spacer may be positioned such that the needle or other conduit forming the tip extends approximately 2-5 mm to pierce through the tread thickness.

Figure 8:
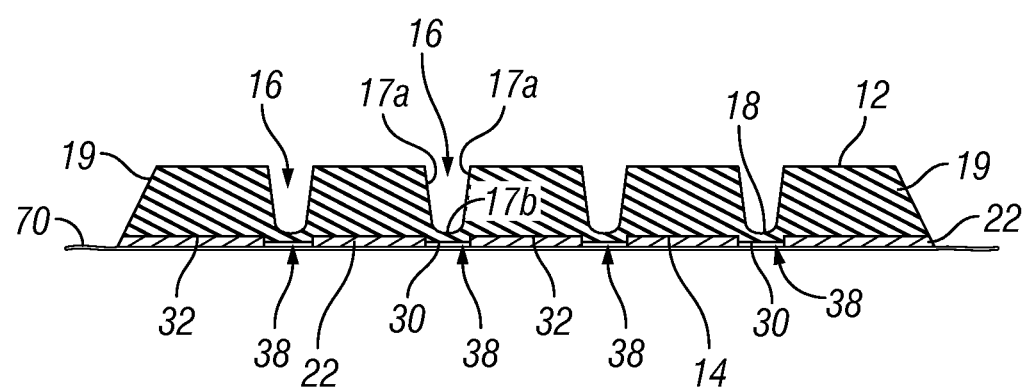
FIG. 8 is a cross-sectional view of a tire tread separated from a tire carcass taken laterally across the tread and showing an undergroove thickness extending from the groove bottom forming protruding portions of the bottom side, in accordance with an embodiment of the invention, with bonding material applied adjacent the protruding portions.

As shown in FIG. 8, the layer of bonding material 22 may be applied to the tire tread prior to applying the tire tread to the tire carcass, for example being prepared at a different time, and optionally, in a different place, than the assembly of the tire. As shown in FIG. 8, the pre-applied bonding material 22 may be covered by a protective film 70 while shipping and handling the tread prior to assembly to the tire carcass. The layer of bonding material may be applied by extrusion or by pre-formed strips. In particular embodiments, one example shown in FIG. 8, the bonding material is applied intermittently such that the bonding material 22 engages the adjacent portions 32 of the tread bottom side 14 located adjacent the protruding portion 30, thereby forming one or more discontinuities 38 arranged across a width of the bonding layer. In such embodiments, the bonding material is not applied to portions of the protruding portions so that when installed on the tire carcass, at least a portion of the outer side of the protruding portion is not bonded to the tire carcass or the bonding layer.

The present invention may be utilized in association with retreaded tires, and in particular for heavy duty trucks and trailers. Heavy duty truck tires include steer and drive tires and trailer tires. Nevertheless, the present invention may be utilized in association with any type of tire to form new or retreaded tire and as such, any type of tire may provide an embodiment of the present invention. Exemplary tire types for use with the subject invention further include light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method for retreading a tire, the method comprising:
   providing a tire tread, the tire tread having:
      a tread thickness bounded by a top side and a bottom side, the top side configured to engage a tire-operating surface and the bottom side configured for attachment to an annular tire carcass;
      a tread width bounded by opposing lateral sides, and a groove extending into the tread thickness from the top side and terminating within the tread thickness at a groove bottom arranged between a pair of opposing groove sides defining a width of the groove, where an undergroove thickness extends from the groove bottom to the tread bottom side, where the undergroove thickness extends from the groove bottom to form a protruding portion of the tread bottom side below the groove bottom such that adjacent portions of the tread bottom side located adjacent the protruding portion are recessed within the tread thickness from an outer side of the protruding portion;
   providing a tire carcass having an annular tread-receiving side which includes a width extending across a width of the tire carcass;
   applying the tire tread to the tire carcass with a layer of bonding material arranged between the tire tread and the tire carcass;
   evacuating a gas from between the tire carcass and the tread bottom side through an aperture extending through the tread thickness, the aperture being formed by piercing the tread thickness with a suctioning member arranged in operable communication with a vacuum source; and,
   bonding the tire tread to the tire carcass, where the step of bonding the tire tread to the tire carcass comprises bonding the tread to the tire carcass with at least a portion of the outer side of the protruding portion not bonded to the tire carcass or the layer of bonding material.

2. The method according to claim 1, where the step of evacuating a gas comprises forming the aperture by piercing through at least a portion of the undergroove thickness.

3. The method according to claim 1, where the suctioning member includes a gas inlet opening spanning between a top and a bottom of the layer of bonding material in an installed position.

4. The method according to claim 1, where the suctioning member includes a spacer configured to position a terminal end of the suctioning member at a desired depth within the tread thickness or assembled retreaded tire.

5. The method according to claim 1, where the layer of bonding material is arranged intermittently across the width of the annular tread-receiving side of the tire carcass and the width of the tire tread along the tread bottom side such that the layer of bonding material includes one or more discontinuities arranged across a width of the layer of bonding material each forming a void within a thickness of the layer of bonding material, the layer of bonding material engaging the adjacent portions of the tread bottom side located adjacent the protruding portion such that the protruding portion of the bottom side is positioned within one of the one or more discontinuities in the layer of bonding material.

6. The method according to claim 5, where each of the one or more discontinuities include continuous or discontinuous longitudinal voids, and the protruding portion extends in a direction of the tread length continuously or discontinuously along a length of the tread, where each of the one or more discontinuities are arranged to correspond to and receive an arrangement of the protruding portion.

7. The method according to claim 5, where each of the one or more discontinuities include continuous or discontinuous lateral voids, and the protruding portion extends in a direction of the tread width continuously or discontinuously along a width of the tread, where each of the one or more discontinuities are arranged to correspond to and receive an arrangement of the protruding portion.

8. The method according to claim 1, further comprising: preparing a bonding surface of the tire carcass by removing a thickness of the tire carcass to form a cavity configured to receive the protruding portion of the tread.

9. The method according to claim 1, where the aperture is arranged in fluid communication with one or more cavities arranged within the tread thickness of the tread provided.

10. The method according to claim 5, where the aperture is arranged in fluid communication with one or more cavities arranged within the tread thickness in fluid communication with the void within a thickness of the layer of bonding material adjacent the protruding portion.

11. The method according to claim 1, where the layer of bonding material is applied to the tire tread prior to the step of applying the tire tread to the tire carcass.

12. The method according to claim 1, where the step of bonding comprises curing the tire without placing the tire in an evacuated envelope.

13. A method for retreading a tire, the method comprising:
providing a tire tread, the tire tread having:
a tread thickness bounded by a top side and a bottom side, the top side configured to engage a tire-operating surface and the bottom side configured for attachment to an annular tire carcass;
a tread width bounded by opposing lateral sides, and
a groove extending into the tread thickness from the top side and terminating within the tread thickness at a groove bottom arranged between a pair of opposing groove sides defining a width of the groove, where an undergroove thickness extends from the groove bottom to the tread bottom side, where the undergroove thickness extends from the groove bottom to form a protruding portion of the tread bottom side below the groove bottom such that adjacent portions of the tread bottom side located adjacent the protruding portion are recessed within the tread thickness from an outer side of the protruding portion;
providing a tire carcass having an annular tread-receiving side which includes a width extending across a width of the tire carcass;
applying the tire tread to the tire carcass with a layer of bonding material arranged between the tire tread and the tire carcass, where the layer of bonding material is arranged intermittently across the width of the annular tread-receiving side of the tire carcass and the width of the tire tread along the tread bottom side such that the layer of bonding material includes one or more discontinuities arranged across a width of the layer of bonding material each forming a void within a thickness of the layer of bonding material, the layer of bonding material engaging the adjacent portions of the tread bottom side located adjacent the protruding portion such that the protruding portion of the bottom side is positioned within one of the one or more discontinuities in the layer of bonding material;
evacuating a gas from between the tire carcass and the tread bottom side through an aperture extending through the tread thickness, the aperture being formed by piercing the tread thickness with a suctioning member arranged in operable communication with a vacuum source; and,
bonding the tire tread to the tire carcass.

14. The method according to claim 13, where each of the one or more discontinuities include continuous or discontinuous longitudinal voids, and the protruding portion extends in a direction of the tread length continuously or discontinuously along a length of the tread, where each of the one or more discontinuities are arranged to correspond to and receive an arrangement of the protruding portion.

15. The method according to claim 13, where each of the one or more discontinuities include continuous or discontinuous lateral voids, and the protruding portion extends in a direction of the tread width continuously or discontinuously along a width of the tread, where each of the one or more discontinuities are arranged to correspond to and receive an arrangement of the protruding portion.

16. The method according to claim 13, where the aperture is arranged in fluid communication with one or more cavities arranged within the tread thickness in fluid communication with the void within a thickness of the layer of bonding material adjacent the protruding portion.

\* \* \* \* \*